US010482020B2

United States Patent
Choi et al.

(10) Patent No.: US 10,482,020 B2
(45) Date of Patent: Nov. 19, 2019

(54) ELECTRONIC APPARATUS FOR OUTPUTTING CONTENT USING PIPELINE AND METHOD OF OPERATING THE SAME

(71) Applicant: SAMSUNG ELECTRONICS CO., LTD., Suwon-si (KR)

(72) Inventors: Kil-soo Choi, Yongin-si (KR); Se-hyun Kim, Daejeon (KR); Seung-bok Kim, Gwacheon-si (KR); Jae-im Park, Suwon-si (KR); Da-hee Jeong, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/934,311

(22) Filed: Mar. 23, 2018

(65) Prior Publication Data
US 2018/0276130 A1    Sep. 27, 2018

(30) Foreign Application Priority Data

Mar. 24, 2017  (KR) .................. 10-2017-0037671

(51) Int. Cl.
| G06F 13/00 | (2006.01) |
| G06F 12/0862 | (2016.01) |
| H04N 21/44 | (2011.01) |
| G06F 9/38 | (2018.01) |

(Continued)

(52) U.S. Cl.
CPC .......... *G06F 12/0862* (2013.01); *G06F 9/383* (2013.01); *H04N 21/4384* (2013.01); *H04N 21/44012* (2013.01); *H04N 21/482* (2013.01); *G06F 2212/6026* (2013.01)

(58) Field of Classification Search
CPC .................................................. G06F 12/0862
See application file for complete search history.

(56) References Cited

U.S. PATENT DOCUMENTS

| 7,177,985 B1* | 2/2007 | Diefendorff ........ G06F 12/0862 |
| | | 711/118 |
| 7,774,578 B2 | 8/2010 | Keltcher |
| 8,667,225 B2 | 3/2014 | Sander et al. |

(Continued)

FOREIGN PATENT DOCUMENTS

| KR | 10-1423748 B1 | 8/2014 |
| KR | 10-1431198 B1 | 8/2014 |

(Continued)

OTHER PUBLICATIONS

Communication dated Aug. 23, 2018, issued by the European Patent Office in counterpart European Patent Application No. 18163483.3.

*Primary Examiner* — Sean D Rossiter
(74) *Attorney, Agent, or Firm* — Sughrue Mion, PLLC

(57) ABSTRACT

An electronic apparatus and an operating method thereof. The electronic apparatus includes a memory which stores one or more instructions and a processor which executes one or more instructions stored in the memory. The processor executes the instructions to obtain one or more contents to be pre-fetched, to obtain one or more resources available in the electronic apparatus, to determine a priority of the one or more resources, and to allocate the one or more of the obtained resources, based on the obtained priority, forming a pipeline in which the obtained one or more contents are processed.

15 Claims, 14 Drawing Sheets

(51) Int. Cl.
  *H04N 21/438* (2011.01)
  *H04N 21/482* (2011.01)

(56) References Cited

U.S. PATENT DOCUMENTS

| | | |
|---|---|---|
| 2003/0159157 A1 | 8/2003 | Chan |
| 2009/0002570 A1 | 1/2009 | Oki |
| 2009/0199190 A1* | 8/2009 | Chen .................. G06F 9/383 718/102 |
| 2013/0326284 A1* | 12/2013 | Losh .................. G06F 11/2053 714/47.2 |
| 2015/0134680 A1 | 5/2015 | Silberstein et al. |
| 2015/0229717 A1* | 8/2015 | Gupta .................. H04L 67/34 718/1 |
| 2016/0283383 A1* | 9/2016 | Svendsen ............ G06F 12/0862 |
| 2017/0116133 A1* | 4/2017 | Kumar ................ G06F 12/1027 |
| 2018/0279233 A1* | 9/2018 | Wang .................. H04W 52/06 |
| 2018/0352049 A1* | 12/2018 | Jeong ................. H04L 67/2847 |
| 2019/0042306 A1* | 2/2019 | Pelt .................... G06F 8/445 |
| 2019/0073310 A1* | 3/2019 | Bretschneider ..... G06F 12/0868 |

FOREIGN PATENT DOCUMENTS

| | | |
|---|---|---|
| KR | 10-2015-0055557 A | 5/2015 |
| KR | 10-1614867 B1 | 4/2016 |
| WO | 2013/016626 A1 | 1/2013 |

\* cited by examiner

FIG. 1
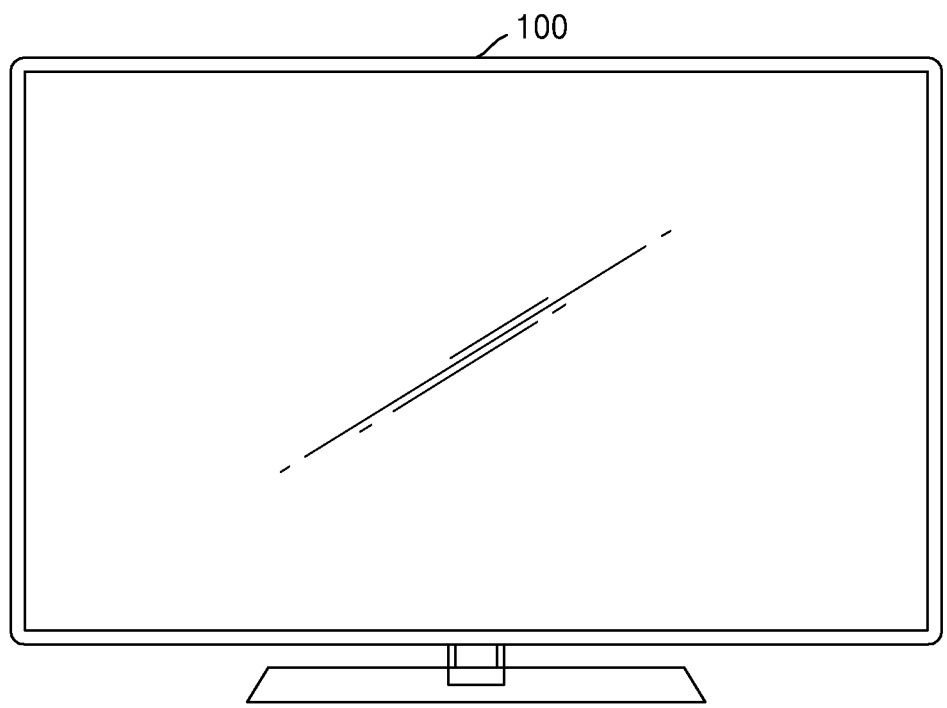
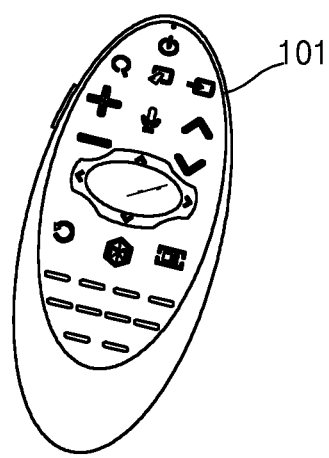

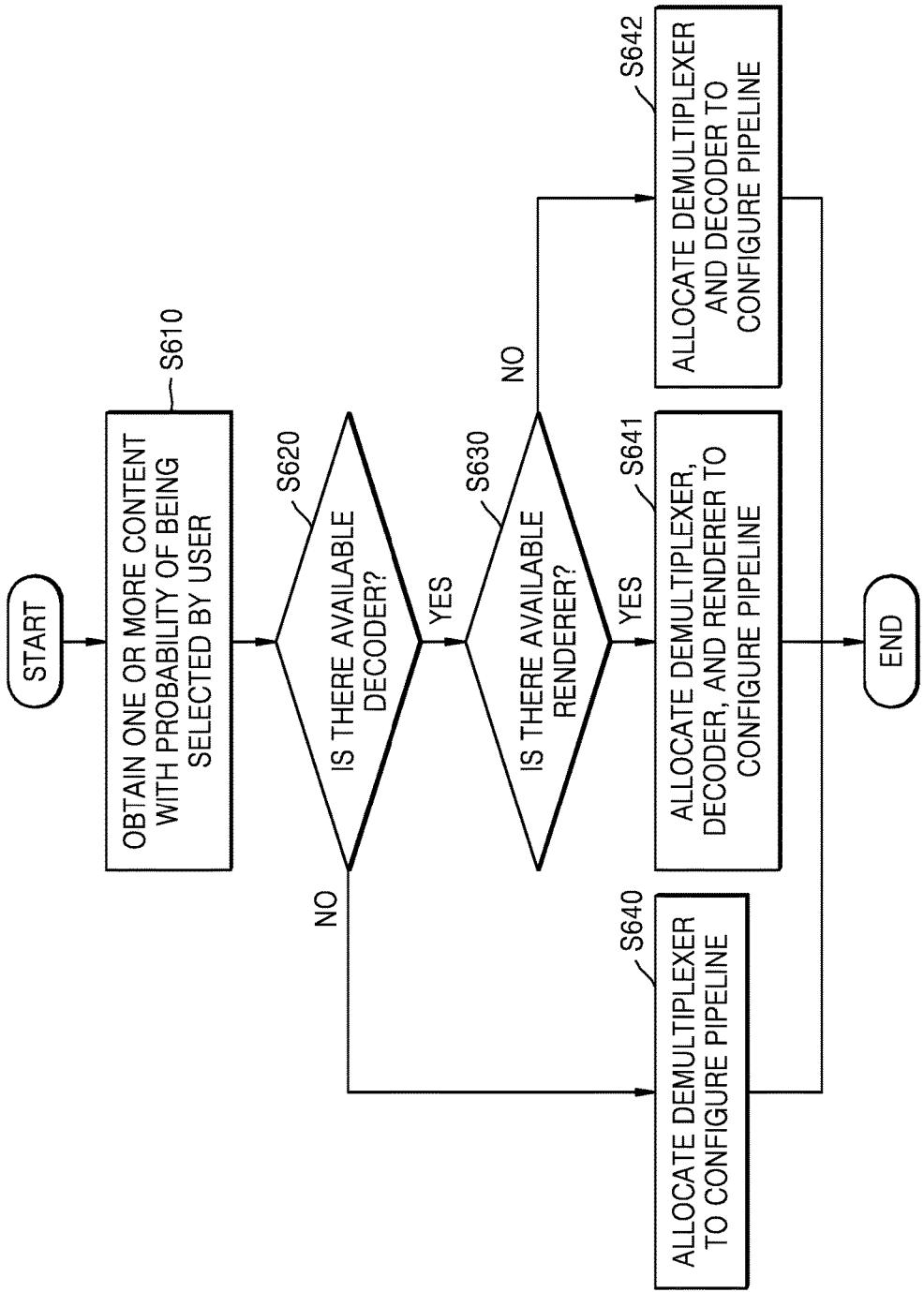

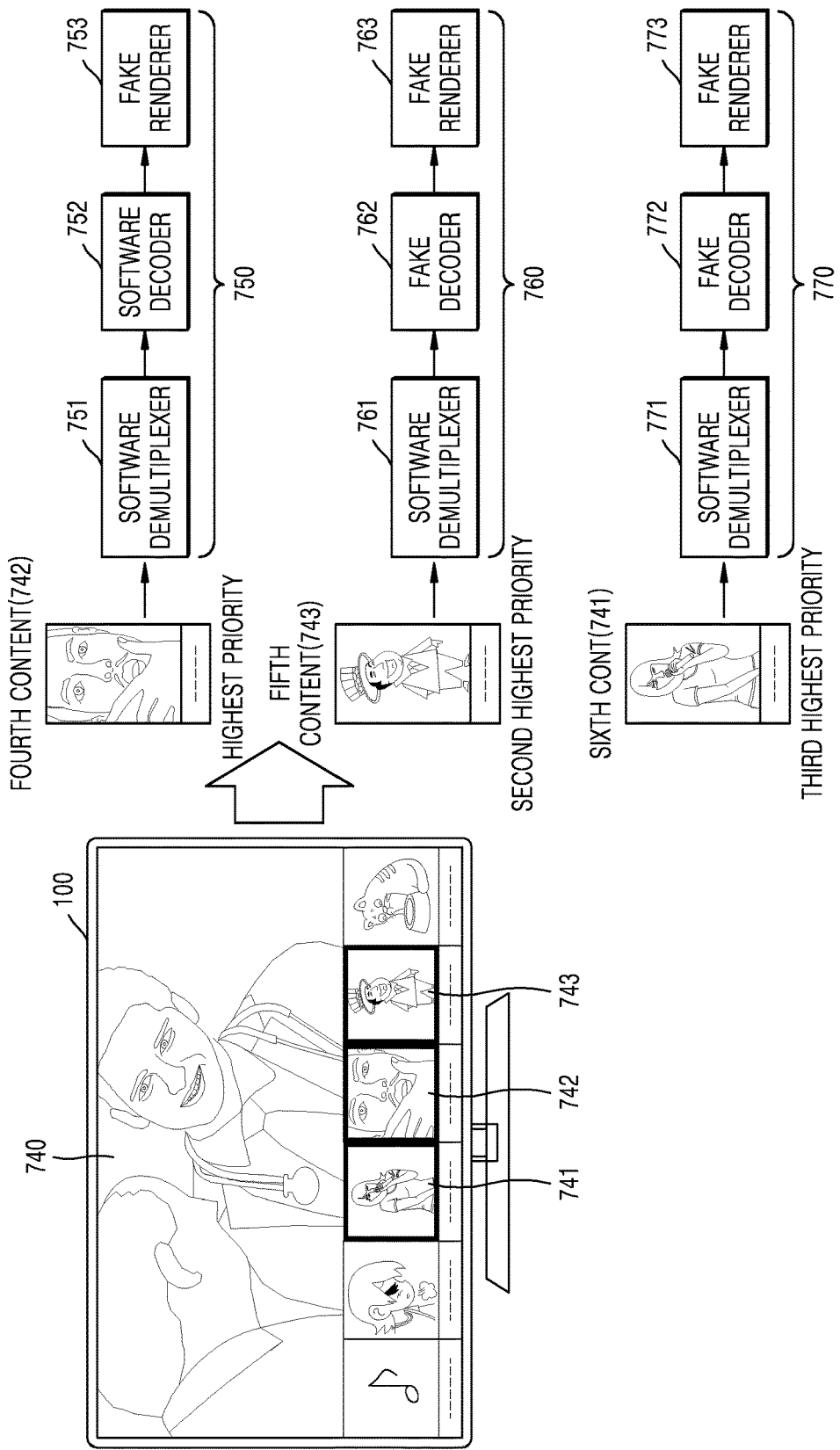

ELECTRONIC APPARATUS FOR OUTPUTTING CONTENT USING PIPELINE AND METHOD OF OPERATING THE SAME

CROSS-REFERENCE TO RELATED APPLICATIONS

This application is based on and claims priority under 35 U.S.C. § 119(a) to Korean Patent Application No. 10-2017-0037671, filed on Mar. 24, 2017, in the Korean Intellectual Property Office, the disclosure of which is incorporated by reference herein in its entirety.

BACKGROUND

1. Field

The disclosure relates to an electronic apparatus and a method of operating the same, and more particularly, to an electronic apparatus for quickly outputting content using a pipeline, and a method of operating the electronic apparatus.

2. Description of Related Art

An electronic apparatus connected to the Internet can receive data through an Internet network so that viewers can receive multimedia content as well as digital broadcasting content through the electronic apparatus connected to the Internet. Also, as areas of video streaming services expand, use of content having a large size of data, such as movies or dramas, is increasing. However, since content having a large size of data requires a large amount of computation in order to process the data, it takes a long time to reproduce the content after it is selected. Accordingly, an apparatus and a method capable of quickly reproducing content having a large size of data are needed.

The above information is presented as background information only to assist with understanding of the disclosure. No determination has been made, and no assertion is made, as to whether any of the above might be applicable as prior art with regard to the disclosure.

SUMMARY

Various embodiments of the disclosure provide an electronic apparatus for configuring a pipeline depending on available resources when pre-fetching one or more items of content so as to quickly output content selected by a user, and a method of operating the electronic apparatus.

Exemplary embodiments may overcome the above disadvantages and other disadvantages not described above. Also, the disclosure is not required to overcome the disadvantages described above, and an exemplary embodiment may not overcome any of the problems described above.

Additional aspects will be set forth in part in the description which follows and, in part, will be apparent from the description, or may be learned by practice of embodiments.

According to an aspect of the disclosure, there is provided an electronic apparatus including: a memory which stores at least one instruction; and a processor which executes the at least one instruction stored in the memory. The processor executes the at least one instruction to obtain at least one content to be pre-fetched from among a plurality of contents, to obtain at least one resource available in the electronic apparatus, to determine a priority of the at least one resource, and to allocate the at least one resource to the obtained at least one content based on the determined priority forming a pipeline in which the obtained at least one content is processed.

The obtained content to be pre-fetched has a probability or a high probability of being selected by a user.

The obtained content to be pre-fetched having the probability of being selected by the user may include at least one content item adjacent to a content on which a focus is currently located. The contents may be presented in a form of a list for a selection by a user.

The processor may execute the at least one instruction to allocate a high priority to a content item, from among the obtained at least one content, located in a direction in which the focus moves, with respect to the content on which the focus is currently located.

The processor may execute the at least one instruction to reallocate, if the priority of the obtained at least one content changes, the obtained resource to the obtained at least one content based on the changed priority reconfiguring a pipeline in which the obtained at least one content is processed.

The processor may execute the at least one instruction to allocate, if the resource for configuring a pipeline for the obtained at least one content is insufficient, a fake resource to the obtained at least one content, which is a part of the pipeline.

The pipeline includes one or more of a parsing operation, a demuxing operation, a decoding operation, and a rendering operation.

The resource may include at least one of a hardware demultiplexer, a software demultiplexer, a hardware decoder, a software decoder, and a hardware renderer.

The processor may execute the at least one instruction to allocate a hardware resource more preferentially to a content having a higher priority. That is, the hardware resource may be allocated to a content that has a higher probability of being selected by a user.

According to an aspect of the disclosure, there is provided a method of operating an electronic apparatus, including: obtaining at least one content to be pre-fetched among a plurality of items of content, obtaining at least one resource available in the electronic apparatus, determine a priority of the at least one resource, and allocating the at least one resource to the obtained at least one content, based on the determined priority, forming a pipeline in which the obtained at least one content is processed.

BRIEF DESCRIPTION OF THE DRAWINGS

These and/or other aspects, features, and advantages of various embodiments will become apparent and more readily appreciated from the following description taken in conjunction with the accompanying drawings, in which:

FIG. 1 is a view illustrating an electronic apparatus according to an embodiment;

FIG. 6 is a flowchart illustrating a method of operating an electronic apparatus according to an embodiment;

FIGS. 7A and 7B are views illustrating an example in which an electronic apparatus configures a pipeline using a fake resource, according to an embodiment;

DETAILED DESCRIPTION OF EXEMPLARY EMBODIMENTS

Figure 2:
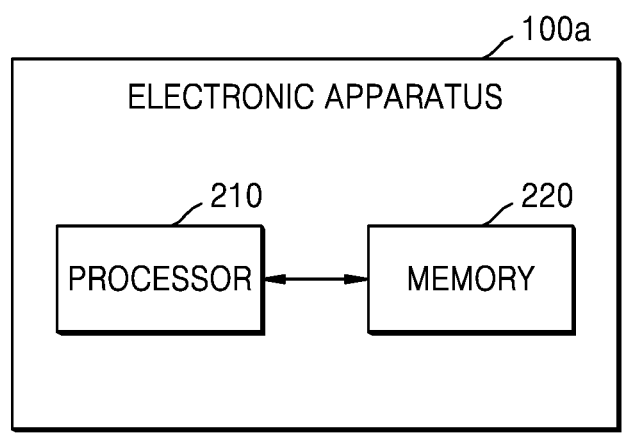
FIG. 2 is a block diagram illustrating a configuration of an electronic apparatus according to an embodiment.

Hereinafter, exemplary embodiments will be described in detail with reference to the appended drawings in order for one of ordinary skill in the art to easily understand and realize the present disclosure. However, the present disclosure can be implemented in various different forms, and is not limited to exemplary embodiments described herein. Also, in the drawings, portions irrelevant to the description are not shown in order to not obscure the present disclosure with unnecessary detail, and throughout the specification, similar components are assigned like reference numerals.

Although general terms being widely used in the present disclosure were selected as terminology used in the present disclosure while considering the functions of the present disclosure, they may vary according to intentions of one of ordinary skill in the art, judicial precedents, the advent of new technologies, and the like. Hence, the terms must be defined based on the meanings of the terms and the content of the entire specification, not by simply stating the terms themselves.

Also, the terms used in the present disclosure are used for describing exemplary embodiments, not for the purpose of limiting the present disclosure. It is to be understood that the singular forms "a," "an," and "the" include plural referents unless the context clearly dictates otherwise. Also, in this specification, it will be understood that the case in which a certain part is "connected" to another part includes the case in which the part is "electrically connected" to the other part with another device in between, as well as the case in which the part is "directly connected" to the other part. Also, it will be understood that when a certain part "includes" a certain component, the part does not exclude another component but can further include another component, unless the context clearly dictates otherwise.

The term "said" and the similar terms used in the present specification, specifically, in the claims may indicate both singular and plural. Also, if the order of operations for describing a method according to an exemplary embodiment is not definitively specified, operations may be performed in appropriate order. However, the present disclosure is not limited to the order in which the operations are described.

The phrases "in some embodiments" or "according to an embodiment" appearing in the present specification do not necessarily indicate the same embodiment.

Some embodiments of the present disclosure may be represented by functional block configurations and various processing operations. The entire or a part of the functional blocks may be implemented with various numbers of hardware and/or software configurations to execute specific functions. For example, the functional blocks of the present disclosure may be implemented with one or more microprocessors, or with circuit configurations for predetermined functions. Also, for example, the functional blocks of the present disclosure may be implemented with various programming or scripting languages. The functional blocks may be implemented with algorithms that are executed by one or more processors. Also, the present disclosure may adopt typical technologies for electronic environment settings, signal processing, and/or data processing. The terms "mechanism", "element", "means", and "configuration" can be broadly used, and are not limited to mechanical and physical configurations.

Also, connection lines or connection members between components shown in the drawings are examples of functional connections and/or physical or circuital connections. In an actual apparatus, the connections between the components may be implemented in the form of various functional connections, physical connections, or circuital connections that can be replaced or added.

Exemplary embodiments will be described in detail with reference to the accompanying drawings.

FIG. 1 is a view illustrating an electronic apparatus according to an embodiment.

As shown in FIG. 1, an electronic apparatus 100 may be a television (TV), although not limited thereto. The electronic apparatus 100 may be implemented as an apparatus including a memory and a processor. For example, the electronic apparatus 100 may be one of various electronic apparatuses, such as a mobile phone, a tablet PC, a digital camera, a camcorder, a laptop computer, a desktop computer, an e-book terminal, a terminal for digital broadcasting, personal digital assistant (PDA), a portable multimedia player (PMP), navigation system, an MP3 player, and a wearable device. Also, the electronic apparatus 100 may be a fixed type or a mobile type, and may be a digital broadcasting receiver that can receive digital broadcasting.

The electronic apparatus 100 according to an exemplary embodiment may further include a display. The electronic apparatus 100 may include a flat display, a curved display whose screen has a curvature, or a flexible display whose curvature can be adjusted. The output resolution of the electronic apparatus 100 may be High Definition (HD), Full HD, Ultra HD, or higher.

The electronic apparatus 100 may be controlled by a controller 101. The controller 101 may be implemented as various types of devices, such as a remote controller, a universal remote controller, or a mobile phone, for controlling the electronic apparatus 100. If a display of the electronic apparatus 100 is implemented as a touch screen, the controller 101 may be replaced with a user's finger or an input pen.

Also, the controller 101 may control the electronic apparatus 100 using short-range communication including infrared or Bluetooth. The controller 101 may control functions of the electronic apparatus 100 using at least one of a key (including a button), a touch pad, a microphone (not shown) for receiving user's voice, and a motion recognition sensor (not shown) of the controller 101.

The controller 101 may include a power-on/off button for turning on/off the electronic apparatus 100. Also, the controller 101 may change channels of the electronic apparatus 100, adjust the volume of the electronic apparatus 100, select terrestrial broadcasting/cable broadcasting/satellite broadcasting, or perform environment settings, according to a user's input. Also, the controller 101 may be a pointing device. For example, the controller 101 may function as a pointing device when receiving a predetermined key input.

In exemplary embodiments, the term "user" means a person who controls the functions or operations of the electronic apparatus 100 using the controller 101, and may include a viewer, a manager, or an installation engineer.

Meanwhile, as video streaming services are growing, and high-definition video content having a large size of data, such as movies and dramas, is widely used, a method for shortening a time taken for content selected by a user to start being reproduced is needed. For example, in a video streaming service, a user may stop reproducing video content he/she is watching currently, and select another video content. In this case, since a process of processing image data to reproduce another video is needed, it may take a long time to reproduce the other video content after the video content he/she is currently watching stops.

The display apparatus 100 according to an exemplary embodiment may configure a pipeline for one or more items of content with a probability of being selected by a user, using resources available in the electronic apparatus 100. At this time, the electronic apparatus 100 may configure different pipelines for the one or more items of content depending on the available resources. Accordingly, the electronic apparatus 100 can more quickly start reproducing content selected by a user.

FIG. 2 is a block diagram illustrating a configuration of an electronic apparatus according to an exemplary embodiment.

Referring to FIG. 2, an electronic apparatus 100a may include a processor 210 and a memory 220. However, the electronic apparatus 100a may be implemented with a larger number of components than the components shown in FIG. 2.

Hereinafter, the components will be described in detail.

The processor 210 may be implemented as various combinations of one or more memory and one or more processors. For example, the memory 220 may create and delete a program module according to operations of the processor 210, and the processor 210 may process operations of the program module.

The processor 210 according to an exemplary embodiment may obtain one or more items of content to be pre-fetched, from among a plurality of items of content. The processor 210 may obtain content with a probability of being selected by a user from among a plurality of items of content, as content to be pre-fetched. For example, the content with the probability of being selected by the user may be obtained based on at least one among a current location of a focus and a movement direction of a focus. For example, the processor 210 may obtain one or more items of content adjacent to content on which a focus is currently located in a list including a plurality of items of content, as content to be pre-fetched. At this time, the number of the content to be pre-fetched may vary according to exemplary embodiments.

The processor 210 according to an exemplary embodiment may obtain resources available in the electronic apparatus 100a. Resources that are used in an image processing process needed for reproducing content may include a demultiplexer, a decoder, and a render, although not limited thereto. The resources may be implemented as hardware or software according to the types of image processing process. For example, the renderer may be implemented as hardware, and the demultiplexer and the decoder may be hardware or software. Data processing speed of resources implemented as hardware may be higher than that of resources implemented as software.

The resources available in the electronic apparatus 100a may change over time. For example, when one content is reproduced, a demultiplexer, a decoder, and a renderer may have been already allocated to process the content being reproduced. However, when there is no content being currently reproduced, all resources of the electronic apparatus 100a may be available resources.

The processor 210 according to an exemplary embodiment may obtain priorities that are used to allocate resources, for the one or more items of content to be pre-fetched. Since the number of resources available in the electronic apparatus 100a is limited, it may be difficult to allocate the same number of resources to all items of content to be pre-fetched. Accordingly, the processor 210 may obtain priorities for one or more items of content to be pre-fetched, and allocate resources based on the priorities.

As described above, according to an exemplary embodiment, the processor 210 may obtain content with a probability of being selected by a user, as content to be pre-fetched. For example, the processor 210 may obtain content with a probability of being selected by a user, based on at least one among a current location of a focus and a movement direction of a focus. At this time, the processor 210 may allocate a high priority to content located in a direction in which a focus moves, with respect to content on which the focus is currently located. For example, when a focus is moving in a right direction, the processor 210 may allocate a high priority to content located to the right of content on which the focus is currently located.

The processor 210 according to an exemplary embodiment may allocate available resources to the one or more items of content to be pre-fetched, based on the obtained priorities, to configure a pipeline for each content. At this time, the processor 210 may allocate a hardware resource more preferentially to content having a higher priority. For example, if two hardware demultiplexers, three software demultiplexers, one hardware decoder, and two software decoders are available resources, the processor 210 may allocate one hardware demultiplexer and one hardware decoder to content having the highest priority among content to be pre-fetched. Then, the processor 210 may allocate the other hardware demultiplexer and one software decoder to content having a second highest priority. As described above, since data processing speed of resources implemented as hardware is higher than that of resources implemented as software, the processor 210 may allocate resources implemented as hardware more preferentially to content with a higher probability of being selected by a user.

Also, if the priorities of the one or more items of content to be pre-fetched change, the processor 210, according to an exemplary embodiment, may reallocate the resources based on the changed priorities.

Also, if resources for configuring a pipeline for each of the one or more items of content to be pre-fetched are insufficient, the processor 210, according to an exemplary embodiment, may allocate a fake resource to configure a pipeline.

The memory 220 according to an exemplary embodiment may store a program for controlling the electronic apparatus 100a, and store data input to the electronic apparatus 100a or data to be output from the electronic apparatus 100a.

The memory 220 may include at least one type of a storage medium, among a flash memory type, a hard disk type, a multimedia card micro type, card type memory (for example, Secure Digital (SD) memory or eXtreme Digital (XD) memory), random access memory (RAM), static random access memory (SRAM), read-only memory (ROM), electrically erasable programmable read-only memory (EEPROM), and programmable read-only memory (PROM), magnetic memory, a magnetic disk, and an optical disk.

The memory 220 according to an exemplary embodiment may include a module including one or more instructions to configure a pipeline for each content by obtaining one or more items of content to be pre-fetched among a plurality of items of content, obtaining resources available in the electronic apparatus 100a, obtaining priorities to be used to allocate the resources for the obtained one or more items of content, and allocating the resources to the one or more items of content based on the priorities.

Figure 3:
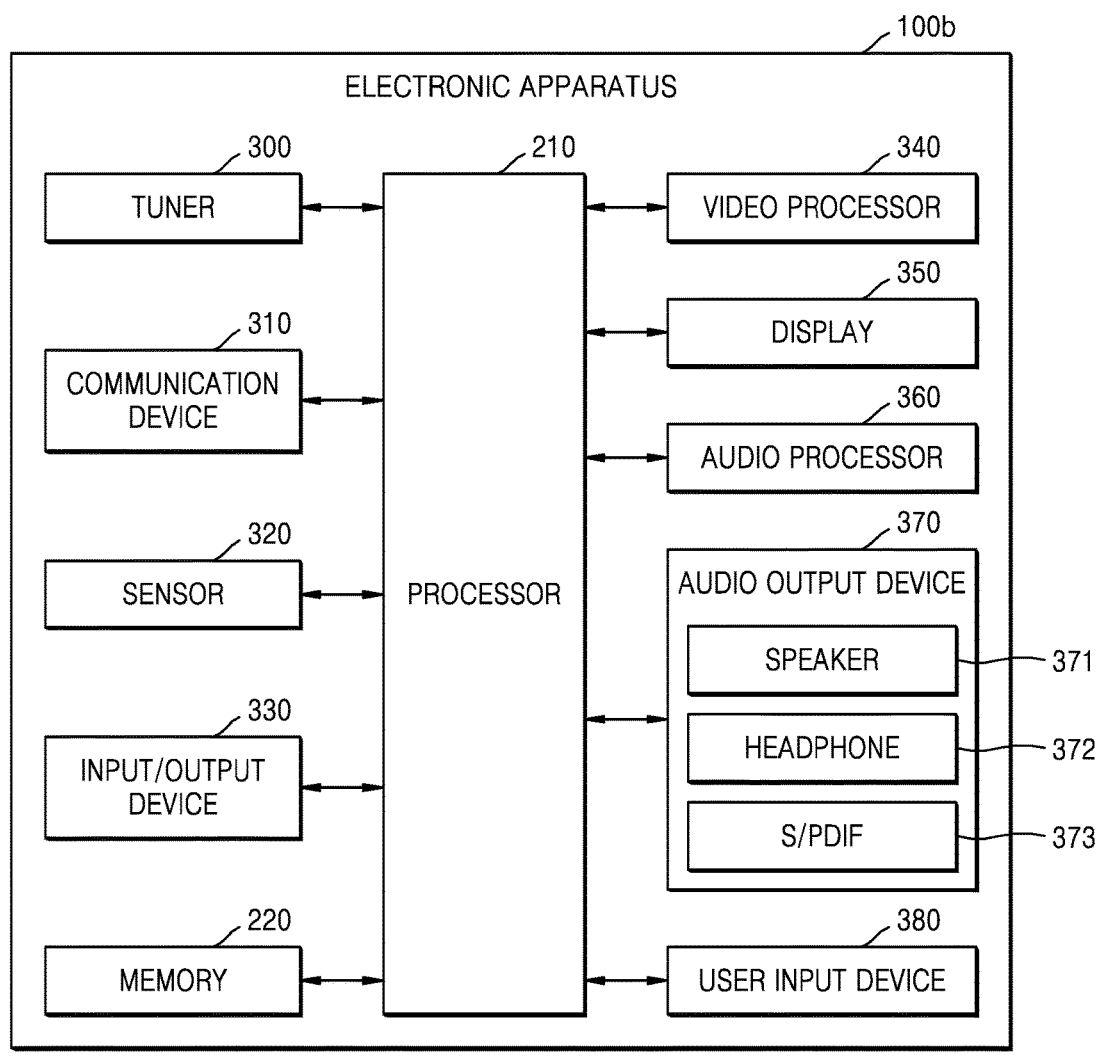
FIG. 3 is a block diagram showing a configuration of an electronic apparatus according to another embodiment.

FIG. 3 is a block diagram illustrating a configuration of an electronic apparatus according to another exemplary embodiment.

As shown in FIG. 3, an electronic apparatus 100b may further include, in addition to the processor 210 and the memory 220, a tuner 300, a communication device 310, a sensor 320, an input/output device 330, a video processor 340, a display 350, an audio processor 360, an audio output device 370, and a user input device 380. Hereinafter, the same description as the above description about the processor 210 and the memory 220 will be omitted in the following description with reference to FIG. 3.

The tuner 300 may amplify, mix, and resonate broadcasting signals received in a wired/wireless fashion to tune a frequency of a desired channel which the electronic apparatus 100b intends to receive among many electromagnetic-wave components and to select the frequency. The broadcasting signals may include audio, video, and additional information (for example, electronic program guide (EPG)).

The tuner 300 may receive a broadcasting signal in a frequency band corresponding to a channel number according to a user input (for example, a control signal received from the controller 101, e.g., a channel number input, a channel up-down input, and a channel input onto an EPG screen).

The tuner 300 may receive a broadcasting signal from various sources, such as terrestrial broadcasting, cable broadcasting, satellite broadcasting, and internet broadcasting. The tuner 300 may receive a broadcasting signal from a source, such as analog broadcasting or digital broadcasting. The broadcasting signal received through the tuner 300 may be decoded to be separated into audio, video, and/or additional information. The separated audio, video, and/or additional information may be stored in the memory 220 under the control of the processor 210.

The electronic apparatus 100b may include one or more tuners 300. The tuner 300 may be implemented as an all-in-one with the electronic apparatus 100b, a separate apparatus (for example, a set-top box (not shown)) having a tuner electrically connected to the electronic apparatus 100b, or a tuner connected to the input/output device 330.

The communication device 310 may connect the electronic apparatus 100b to an external device (for example, audio system) under the control of the processor 210. The processor 210 may transmit/receive content to/from the external device connected through the communication device 310, download an application from the external device, or perform web-browsing. The communication device 310 may include one of a wireless local area network (WLAN), Bluetooth, and wired Ethernet in correspondence to the performance and structure of the electronic apparatus 100b.

Also, the communication device 310 may include a combination of a WLAN, Bluetooth, and wired Ethernet. The communication device 310 may receive a control signal of the controller 101 under the control of the processor 210. The control signal may be implemented as a Bluetooth type, a radio frequency (RF) signal type, or a Wi-Fi type. The communication device 310 may further include another short-range communication (for example, near field communication (NFC, not shown) or Bluetooth Low Energy (BLE)) than Bluetooth.

The sensor 320 may sense a user's voice, a user's image, or a user's interaction, and may include a microphone, a camera, and an optical receiver.

The microphone may receive voice uttered from a user. The microphone may convert the received voice to an electrical signal, and output the electrical signal to the processor 210. The user's voice may include, for example, voice corresponding to a menu or function of the electronic apparatus 100b.

The camera may receive an image (for example, successive frames) corresponding to the user's motion including a gesture within a camera recognition range. The processor 210 may select a menu displayed on the electronic apparatus 100b using the result of motion recognition, or perform a control operation corresponding to the result of motion recognition. For example, the processor 210 may change channels, adjust the volume, move an indicator, or move a cursor.

The optical receiver may receive an optical signal (including a control signal) from an external controller through a light window (not shown) of a bezel of the display 350. The optical receiver may receive an optical signal corresponding to a user input (for example, a touch, pressing, a touch gesture, voice, or a motion) from the controller 101. A control signal may be extracted from the received optical signal under the control of the processor 210.

The input/output device 330 may receive video (for example, moving images), audio (for example, voice, music, etc.), and additional information (for example, EPG) from the outside of the electronic apparatus 100b under the control of the processor 210. The input/output device 330 may include one of a high definition multimedia interface (HDMI) port, a component jack, a PC port, and a USB port. The input/output device 330 may include a combination of a HDMI port, a component jack, a PC port, and a USB port.

The processor 210 may control overall operations of the electronic apparatus 100b and signal flow between the internal components of the electronic apparatus 100b, and process data. If a user input is received or if a predetermined, stored condition is satisfied, the processor 210 may execute an operating system (OS) and various applications stored in the memory 220.

The video processor 340 may process image data that is to be displayed on the display 350, and perform various image processing operations on the image data, such as decoding, rendering, scaling, noise filtering, frame-rate conversion, and resolution conversion. According to an exemplary embodiment, the video processor 340 may include at least one demultiplexer, at least one decoder, and at least one renderer. Additional details about the video processor 340, according to an exemplary embodiment, will be described below with reference to FIG. 4.

The display 350 may display image data processed by the video processor 340. The display 350 may display video included in a broadcasting signal received through the tuner 300 under the control of the processor 210. Also, the display 350 may display content (for example, video) received through the communication device 310 or the input/output device 330. The display 350 may output an image stored in the memory 220 under the control of the processor 210.

Also, the display 350 may display a voice User Interface (UI, for example, including a voice command guide) to perform a voice recognition task corresponding to voice recognition, or a motion UI (for example, including a user motion guide for motion recognition) to perform a motion recognition task corresponding to motion recognition.

If the display 350 is implemented as a touch screen, the display 350 may be used as an input device, as well as an output device. The display 350 may include at least one of a liquid crystal display (LCD), a thin film transistor-liquid crystal display (TFT-LCD), an organic light-emitting diode (OLED) display, a flexible display, a 3-Dimensional (3D) display, and an electrophoretic display.

Also, according to an implementation type of the electronic apparatus 100b, the electronic apparatus 100b may include two or more displays 350.

The audio processor 360 may process audio data. The audio processor 360 may perform various processing on audio data, such as decoding, amplification, and noise-filtering. Meanwhile, the audio processor 360 may include a plurality of audio processing modules to process audio corresponding to a plurality of items of content.

The audio output device 370 may output audio included in a broadcasting signal received through the tuner 300 under the control of the processor 210. The audio output device 370 may output audio (for example, voice and sound) received through the communication device 310 or the input/output device 330. Also, the audio output device 370 may output audio stored in the memory 220 under the control of the processor 210. The audio output device 370 may include at least one of a speaker 371, a headphone output terminal 372, or a Sony/Philips digital interface (S/PDIF) output terminal 373. The audio output device 370 may include a combination of the speaker 371, the headphone output terminal 372, and the S/PDIF output terminal 373.

The user input device 380 enables a user to input data for controlling the electronic apparatus 100b. For example, the user input device 380 may include, but is not limited to, a key pad, a dome switch, a touch pad (a touch capacitive-type touch pad, a pressure resistive-type touch pad, an infrared beam sensing-type touch pad, a surface acoustic wave-type touch pad, an integral strain gauge-type touch pad, a piezoelectric effect-type touch pad, or the like), a jog wheel, and a jog switch. These are provided by way of an example and not by way of a limitation.

For example, the user input may include an input of moving a location of a focus, or an input of selecting content on which a focus is currently located. If the user input device 380 is configured with a key pad or a dome switch, a user input of moving a location of a focus may be an input of clicking or pressing a key corresponding to a predetermined direction. Also, if the user input device 380 is configured with a touch pad, a user input of moving a location of a focus may be an input of touching a key corresponding to a specific direction, although not limited thereto. The user input device 380 may be a component of the controller 101, or a component of the electronic apparatus 100b.

Meanwhile, the block diagrams of the electronic apparatuses 100a and 100b shown in FIGS. 2 and 3 are block diagrams for exemplary embodiments. Some components included in the individual block diagrams may be integrated or omitted, or another component may be added, according to actual specifications of the electronic apparatuses 100a and 100b. For example, two or more components may be integrated into one component, or one component may be separated into two or more components, as necessary. Also, functions performed in the individual blocks are provided to describe exemplary embodiments, and the detailed operations or devices for the functions do not limit the scope of rights of the present disclosure.

Figure 4:
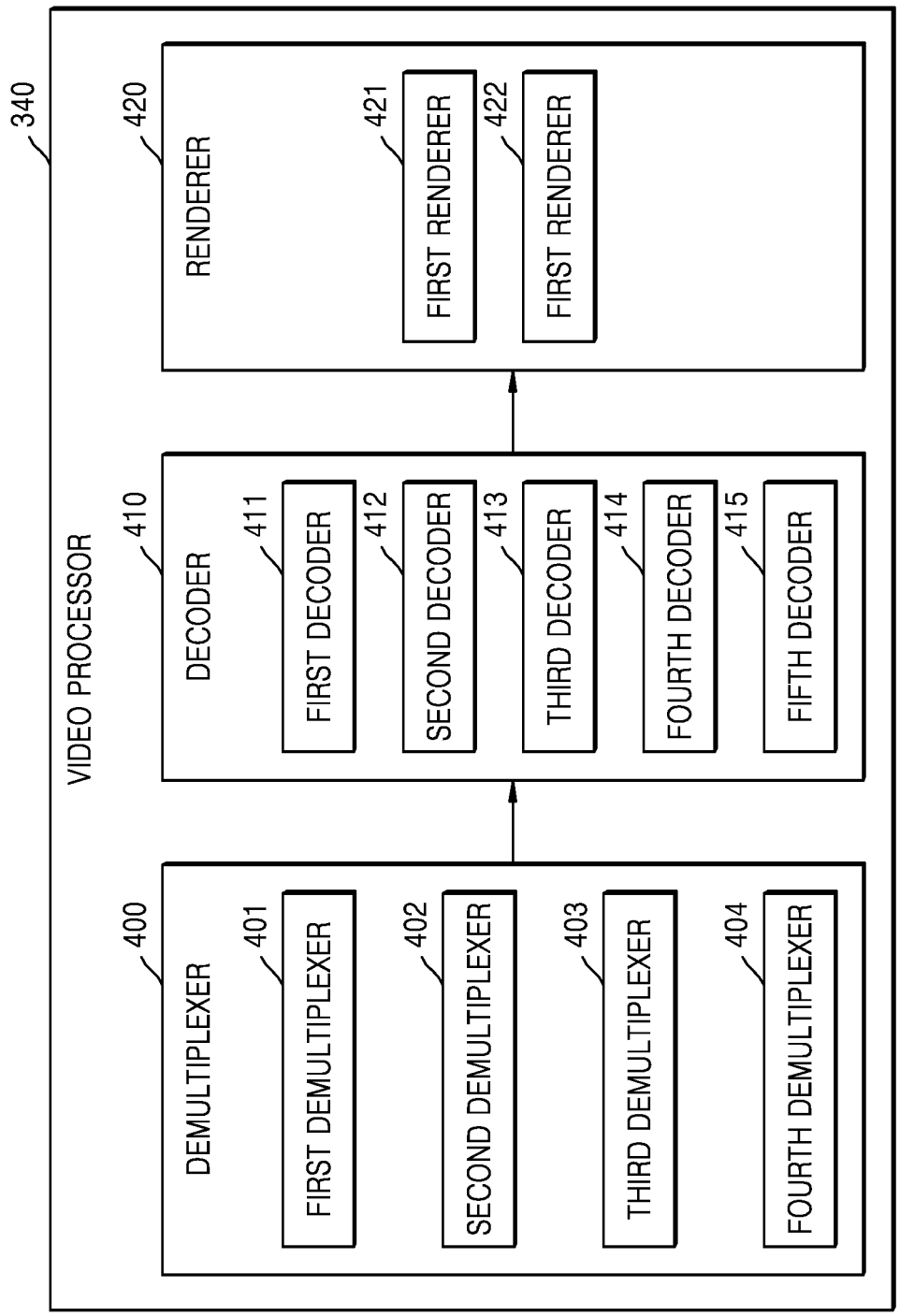
FIG. 4 is a block diagram showing a configuration of a video processor according to an embodiment.

FIG. 4 is a block diagram illustrating a detailed configuration of a video processor according to an embodiment.

The video processor 340 according to an exemplary embodiment may include various resources including a demultiplexer 400, a decoder 410, and a renderer 420.

The demultiplexer 400 may divide video content received from the video processor 340 into video data and audio data. Also, the decoder 410 may decode compressed and encoded image data, and the renderer 420 may convert the image data decoded by the decoder 410 to be suitable for screen resolution and screen ratio of an electronic apparatus 100. Also, the electronic apparatus 100 may output the image data rendered by the renderer 420 onto a screen.

For example, referring to FIG. 4, the video processor 340 may include a plurality of demultiplexers, a plurality of decoders, and a plurality of renderers. The demultiplexers and the decoders may be implemented as hardware and/or software, and the renderers may be implemented as hardware. Accordingly, the video processor 340 may include one or more hardware demultiplexers, one or more software demultiplexers, one or more hardware decoders, one or more software decoders, and one or more hardware renderers, according to exemplary embodiments. For example, as shown in FIG. 4, the video processor 340 may include two hardware demultiplexers 401 and 402, two software demultiplexers 403 and 404, two hardware decoders 411 and 412, three software decoders 413, 414, and 415, and two hardware renderers 421 and 422. However, the number of the resources is not limited to the above-described example, and may change according to exemplary embodiments.

The number of software resources may change according to the performance of the processor 210 and the memory 220 of the electronic apparatus 100. As the number of software resources increases, data processing speed of the electronic apparatus 100 may be lowered. Also, since data processing speed of hardware resources is higher than that of software resources, the electronic apparatus 100 may allocate hardware resources more preferentially than software resources when both the hardware resources and the software resources are available.

Also, according to an exemplary embodiment, the renderer 420 may perform scaling for adjusting rendered image data to be suitable for a screen size. The scaling may be performed by the renderer 420 together with the rendering. Alternatively, the scaling may be performed by a separate scaler module.

Figure 5:
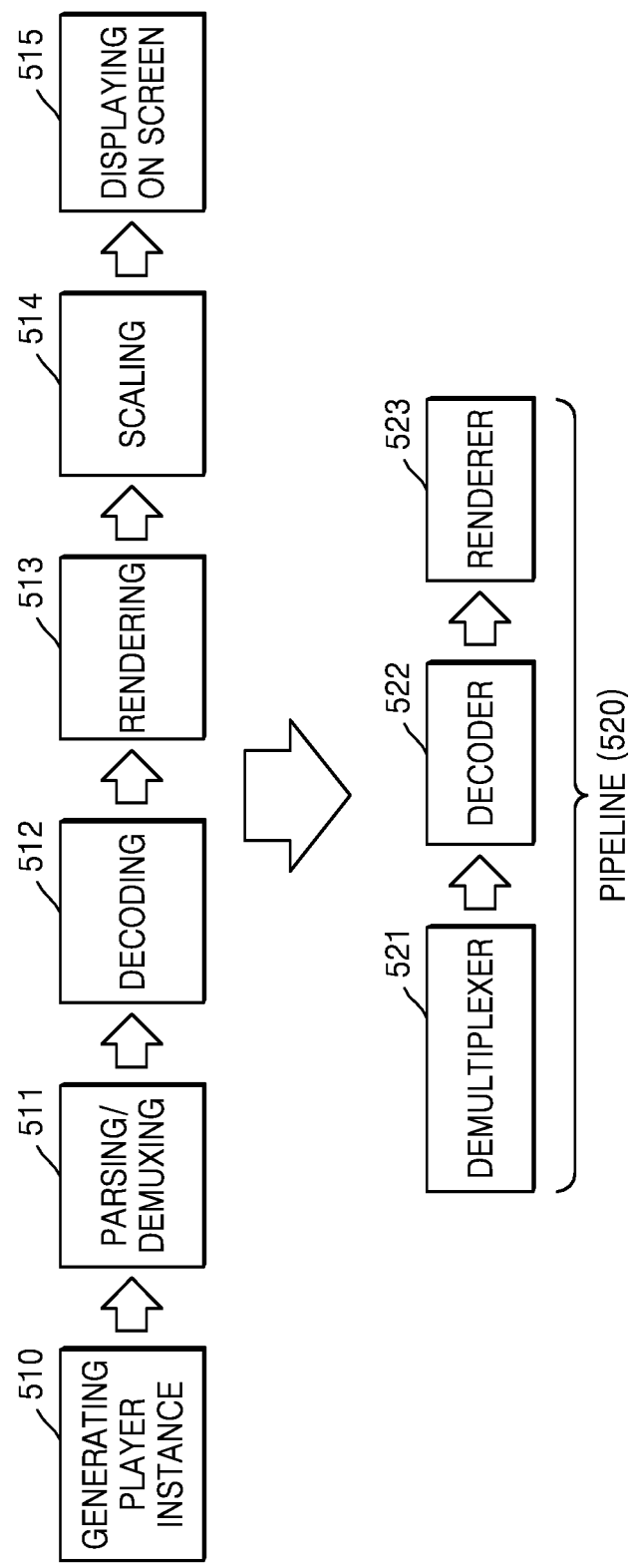
FIG. 5 is a flow diagram illustrating processing of image data by an electronic apparatus according to an embodiment.

FIG. 5 is a flow diagram illustrating a process of processing image date by an electronic apparatus according to an embodiment.

Referring to FIG. 5, the electronic apparatus 100 according to an exemplary embodiment may perform an operation 510 of generating a player instance, a parsing and demuxing operation 511, a decoding operation 512, a rendering operation 513, and a scaling operation 514, in order to output content onto a screen. At this time, the scaling operation 514 may be performed simultaneously with the rendering operation 513 or after the rendering operation 513, according to exemplary embodiments. The electronic apparatus 100 may display image data in operation 515 subject to the rendering operation 513 and the scaling operation 415 on a screen.

The electronic apparatus 100 according to an exemplary embodiment may use resources including a demultiplexer 521, a decoder 522, and a renderer 523, to perform the parsing and demuxing operation 511, the decoding operation 512, the rendering operation 513, and the scaling operation 514. For example, the electronic apparatus 100 may use the demultiplexer 521 to perform the parsing and demuxing operation 511, use the decoder 522 to perform the decoding operation 512, and use the renderer 523 to perform the rendering operation 513 and the scaling operation 514. As described above, a plurality of operations (for example, the parsing and demuxing operation 511, the decoding operation 512, the rendering operation 513, and the scaling operation 514) for processing image data may be needed in order to output content on a screen. Accordingly, it may take a predetermined time to select content and to output the selected content on a screen, and content having a larger size of data may require a longer time. Accordingly, the electronic apparatus 100 may allocate resources to one or more items of content to be pre-fetched among a plurality of items of content, and configure a pipeline 520 for each content using the allocated resources. At this time, the electronic apparatus 100 may configure a pipeline 520 using the demultiplexer 521, the decoder 522, and the renderer 523, and may further include a scaler according to an exemplary embodiment. The electronic apparatus 100 may perform pre-fetching on one or more items of content with a probability of being selected by a user to more quickly reproduce one(s) of the pre-fetched content, selected by the user.

FIG. 6 is a flowchart illustrating a method of operating an electronic apparatus according to an embodiment.

The electronic apparatus 100 according to an exemplary embodiment may configure a pipeline for each of one or more items of content to be pre-fetched, in consideration of resources available in the electronic apparatus 100.

In operation S610, the electronic apparatus 100 may obtain one or more items of content with a respective probability of being selected by a user. For example, the one or more items of content with the probability of being selected by the user may include content adjacent to content on which a focus is currently located, among a plurality of items of content, although not limited thereto.

In operation S620, the electronic apparatus 100 may determine whether there is an available decoder. For example, when the electronic apparatus 100 includes two hardware decoders and two software decoders, and one of the two hardware decoders is being used, the electronic apparatus 100 may obtain the other hardware decoder and the two software decoders as available decoders.

If there is no available decoder, the electronic apparatus 100 may allocate a demultiplexer to the content obtained in operation S610 to configure a pipeline for the corresponding content, in operation S640. Accordingly, the electronic apparatus 100 may use the demultiplexer to perform demultiplexing of the content obtained in operation S610.

However, if there is an available decoder, the electronic apparatus 100 may obtain whether there is an available renderer, in operation S630.

If the electronic apparatus 100 obtains that there is an available renderer in operation 630, the electronic apparatus 100 may allocate the demultiplexer, the decoder, and the renderer to the content obtained in operation S610 to configure a pipeline for the corresponding content, in operation S641. Accordingly, the electronic apparatus 100 may use the demultiplexer, the decoder, and the renderer to perform demultiplexing, decoding, and rendering on the content obtained in operation S610. Also, if the renderer includes functions of a scaler, the electronic apparatus 100 may perform demultiplexing, decoding, rendering, and scaling in advance.

If the electronic apparatus 100 determines that there is no available renderer, the electronic apparatus 100 may allocate the demultiplexer and the decoder to configure a pipeline for the content obtained in operation S610, in an operation S642. Accordingly, the electronic apparatus 100 may use the demultiplexer and the decoder to perform demultiplexing and decoding on the corresponding content.

Accordingly, since the electronic apparatus 100 according to an exemplary embodiment configures a pipeline based on available resources i.e., based on a state of resources, the electronic apparatus 100 can efficiently pre-fetch content which have a probability or a high probability of being selected by a user.

Figure 7A:
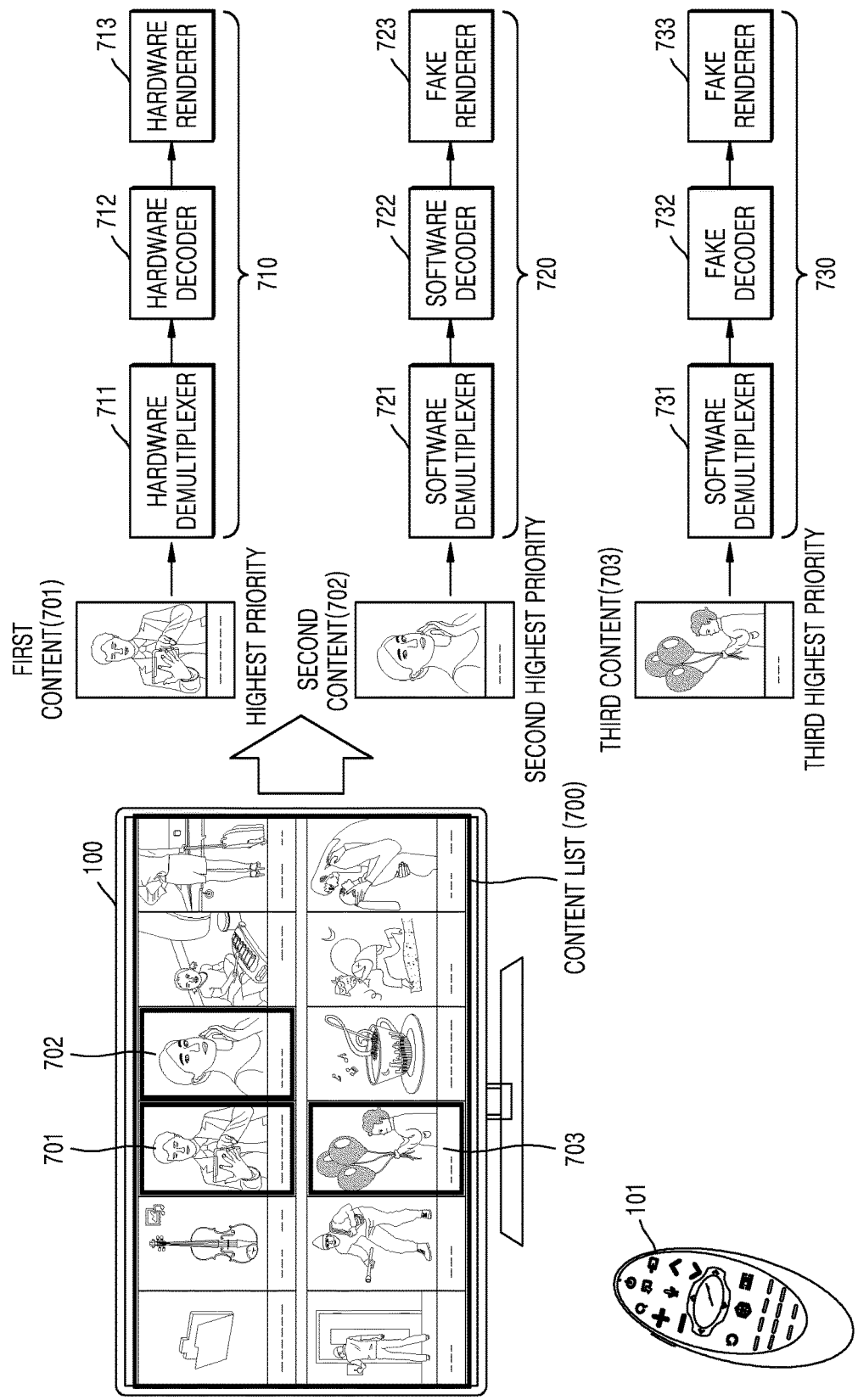

FIGS. 7A and 7B are views illustrating an example of an electronic apparatus configuring a pipeline using a fake resource according to an embodiment.

The electronic apparatus 100 according to an exemplary embodiment may obtain priories to be used to allocate resources, for one or more items of content to be pre-fetched. Since the number of resources (for example, demultiplexers, decoders, and renderers) available in the electronic apparatus 100a is limited, it may be difficult to allocate, when there are a plurality of items of content to be pre-fetched, the same number of resources to all of the plurality of items of content. Accordingly, the electronic apparatus 100 may obtain priorities to be used to allocate resources, for the plurality of items of content to be pre-fetched, and allocate the resources more preferentially to content having higher priorities.

The electronic apparatus 100 according to an exemplary embodiment may obtain a plurality of items of content with a probability of being selected by a user, as content to be pre-fetched. At this time, the electronic apparatus 100 may obtain content adjacent to content on which a focus is currently located, among the plurality of items of content, as content to be pre-fetched. For example, the electronic apparatus 100 may obtain at least one of content located to the left, right, top, and bottom of content on which a focus is currently located, as content to be pre-fetched.

For example, referring to FIG. 7A, the electronic apparatus 100 may display a content list 700 including a plurality of items of content on a screen. The plurality of items of content may be video content that can be reproduced on the electronic apparatus 100, although not limited thereto. If a focus is currently located on first content 701 in the content list 700, the electronic apparatus 100 may pre-fetch the first content 701, second content 702 located to the right of the first content 701, and third content 703 located below the first content 701. However, the number of content to be pre-fetched is not limited to this, and may vary according to exemplary embodiments.

The electronic apparatus 100 according to an exemplary embodiment may obtain priorities to be used to allocate resources, for the plurality of items of content (for example, the first to third content 701 to 703) to be pre-fetched. The electronic apparatus 100 may obtain priorities based on a direction in which the focus moves. For example, the electronic apparatus 100 may allocate a high priority to content located in a direction in which the focus moves, with respect to the content (for example, the first content 701) on which the focus is currently located.

For example, referring to FIG. 7A, if an external input of moving the focus to the right is repeatedly received from the controller 101, there may be a high probability that the user selects the second content 702 located to the right of the first content 701 on which the focus is currently located, rather than the third content 703. Accordingly, the electronic apparatus 100 may allocate a higher priority to the second content 702 than to the third content 703.

The electronic apparatus 100 according to an exemplary embodiment may configure a pipeline for each of the plurality of items of content to be pre-fetched, based on the obtained priorities. For example, the electronic apparatus 100 may obtain three items of content with probability of being selected by the user, and configure a pipeline for each of the obtained three items of content, as shown in FIG. 7A.

If resources available in the electronic apparatus 100 are one hardware demultiplexer, three software demultiplexers, one hardware decoder, one software decoder, and one hardware renderer, the electronic apparatus 100 may allocate hardware more preferentially to content having a higher priority. Accordingly, the electronic apparatus 100 may more quickly pre-fetch content having a higher priority.

For example, referring to FIG. 7A, the electronic apparatus 100 may allocate a hardware demultiplexer 711, a hardware decoder 712, and a hardware renderer 713 to the first content 701 having a highest priority to configure a pipeline 710 for the first content 701. Also, the electronic apparatus 100 may allocate a software demultiplexer 721 and a software decoder 722 to the second content 702 having a second highest priority. In this case, since there is no renderer that can be allocated to the second content 702, the electronic apparatus 100 may allocate a fake renderer 723 to the second content 702 to configure a pipeline 720 for the second content 702. The fake renderer 723 may be a software module to be used to configure the pipeline 720 when there is no actual resource, although it is not a resource capable of actually performing rendering.

The hardware renderer 713, which is an actual resource, may render decoded image data, and output the rendered image data to be displayed on a screen. Unlike this, since the fake renderer 723 is not a resource capable of actually performing rendering, the fake renderer 723 can store the decoded image data without processing and outputting it. For example, the fake renderer 723 may store decoded image data, and when an actual renderer capable of performing rendering is allocated to the second content 702, the fake renderer 723 may transfer the decoded image data to the actual renderer. Accordingly, the actual renderer can render the decoded image data received from the fake renderer 723. Alternatively, according to an exemplary embodiment, the fake renderer 723 may include no output terminal. If an actual renderer capable of performing rendering is allocated to the second content 702 when available resources change, the processor 210 may perform an operation of replacing the fake renderer 723 with the actual renderer. Also, the processor 210 may transfer the decoded image data stored in the fake renderer 723 to the actual renderer.

Also, the electronic apparatus 100 may allocate a software demultiplexer 731 to the third content 703 having a third highest priority. In this case, since there are neither a decoder nor a renderer that can be allocated to the third content 703, the electronic apparatus 100 may allocate a fake decoder 732 and a fake renderer 733 to the third content 703 to configure a pipeline 730 for the third content 703. The fake decoder 732 and the fake renderer 733 are shown as separate components in FIG. 7A, however, the fake decoder 732 and the fake renderer 733 may be implemented as a fake module or a fake sink.

The fake decoder 732 cannot actually decode image data, unlike the hardware decoder 712 and the software decoder 722 which are actual (existing) resources. Accordingly, the fake decoder 732 may store demuxed image data without processing it and outputting it to the fake renderer 723. For example, the fake decoder 732 may store demuxed image data, and when an actual decoder capable of performing decoding is allocated to the third content 703, the fake decoder 723 may transfer the demuxed image data to the actual decoder. Accordingly, the actual decoder can decode the demuxed image data received from the fake decoder 732. Alternatively, according to an exemplary embodiment, the fake decoder 732 may include no output terminal. If an actual decoder capable of performing decoding is allocated to the third content 703 when available resources change, the processor 210 may perform operation of replacing the fake decoder 732 with the actual decoder. Also, the processor 210 may transfer the decoded image data stored in the fake decoder 732 to the actual decoder.

The number of resources available in the electronic apparatus 100 according to an exemplary embodiment may depend on whether there is content being reproduced. For example, as shown in FIG. 7A, if there is no content being reproduced, and a content list including a plurality of items of content is displayed on the full screen, the number of resources available for pre-fetching may increase compared to a case in which there is content being reproduced.

Unlike this, when predetermined content is being reproduced, a demultiplexer, a decoder, and a renderer may be allocated to process the content being reproduced. Accordingly, the number of resources available for pre-fetching may be less than in the case shown in FIG. 7A.

For example, as shown in FIG. 7B, there may be a case in which predetermined content 740 is being reproduced on the electronic apparatus 100. In this case, since a demultiplexer, a decoder, and a renderer are allocated to process the content 740 being reproduced, the number of resources available for pre-fetching may be less than in the case shown in FIG. 7A. For example, in the case of FIG. 7A, available resources may be one hardware demultiplexer, three software demultiplexers, one hardware decoder, one software decoder, and one hardware renderer. However, in the case of FIG. 7B, available resources may be three software demultiplexers and one software decoder. Accordingly, the electronic apparatus 100 may allocate a software demultiplexer 751 and a software decoder 752 to fourth content 742 having a highest priority among three items of content 741, 742, and 743 to be pre-fetched. In this case, since there is no renderer that can be allocated to the fourth content 742, the electronic apparatus 100 may allocate a fake renderer 753 to the fourth content 742 to configure a pipeline 750 for the fourth content 742.

The electronic apparatus 100 may allocate software demultiplexers 761 and 771 to the fifth content 743 having a second highest priority and the sixth content 741 having a third highest priority, respectively. Also, since there are neither a decoder nor a renderer that can be allocated to the fifth content 743 and the sixth content 741, the electronic apparatus 100 may allocate fake decoders 762 and 772 and fake renderers 763 and 773 to the fifth content 743 and the sixth content 741, respectively, to configure pipelines 760 and 770. As described above, according to an exemplary embodiment, the fake decoders 762 and 772 and the fake renderers 763 and 773 may be implemented as a fake module, not as separate components.

Figure 8A:
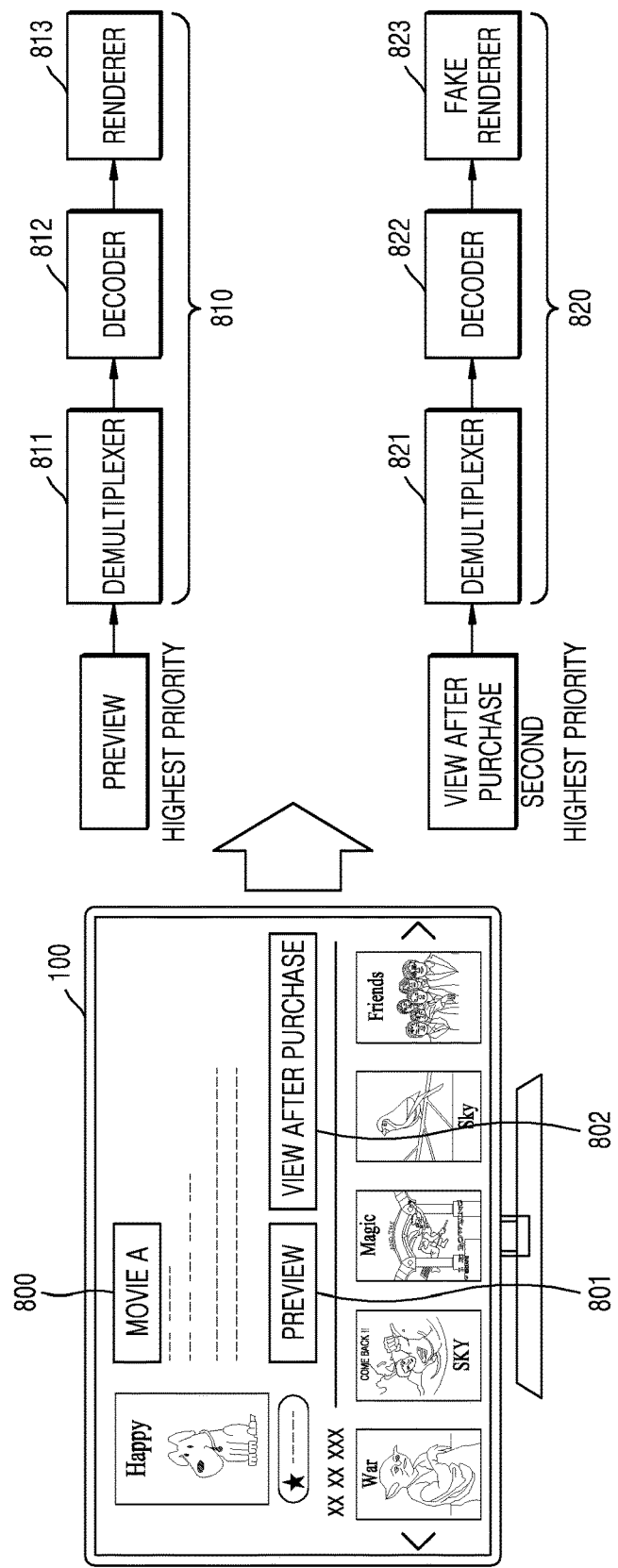
FIGS. 8A and 8B are views illustrating an example in which an electronic apparatus allocates resources based on priorities of a plurality of items of content when performing pre-fetching according to an embodiment.
Figure 8B:
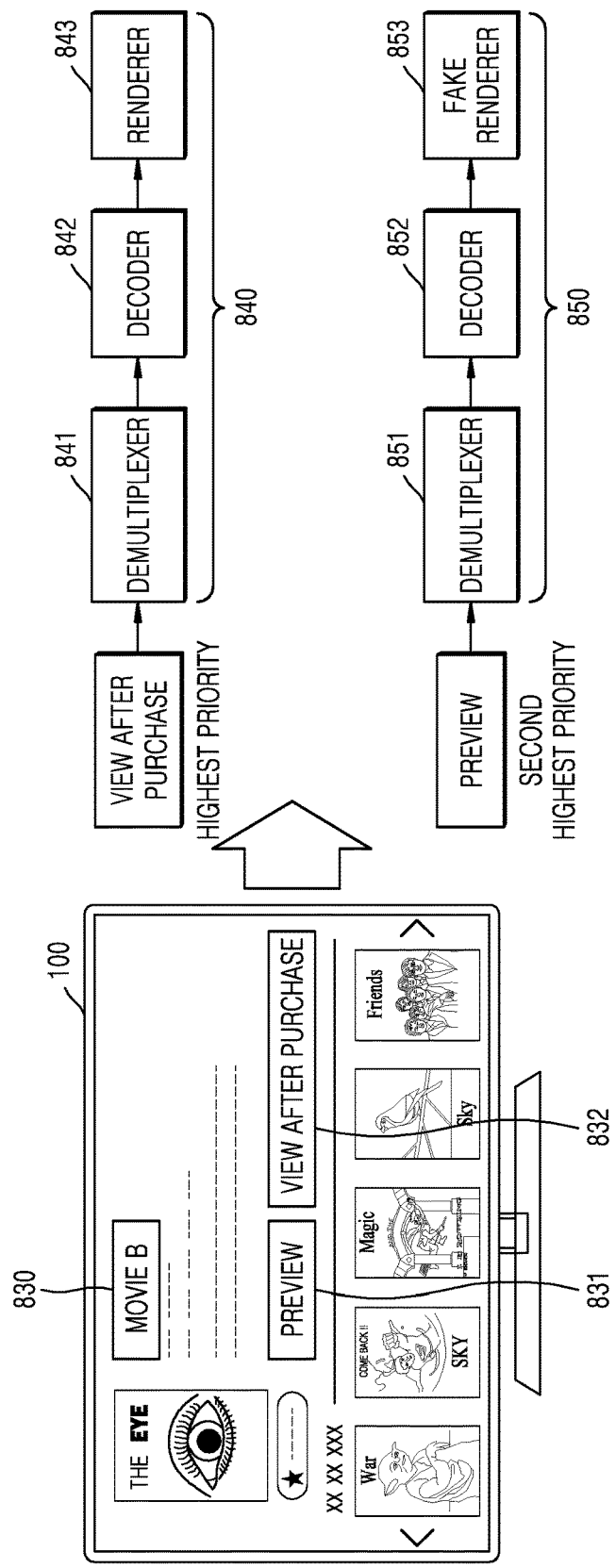

FIGS. 8A and 8B are views illustrating an example in which an electronic apparatus allocates resources based on priorities of one or more items of content to be pre-fetched according to an embodiment.

As described above, the electronic apparatus 100 according to an embodiment can configure a pipeline for each content by allocating resources based on priorities of one or more items of content to be pre-fetched. At this time, criteria based on which the electronic apparatus 100 obtains the priorities may vary according to embodiments. For example, as shown in FIGS. 7A and 7B, the electronic apparatus 100 may obtain priorities based on a current location of a focus and a movement direction of a focus.

Also, the electronic apparatus 100 may obtain priorities based on types of content to be pre-fetched. For example, referring to FIGS. 8A and 8B, if an external input of selecting movie A 800 from among a plurality of items of content is received, content with a probability of being selected by a user may be content related to the movie A 800. For example, if the movie A 800 is a fee content (content for which the user must pay), the electronic apparatus 100 may obtain "preview" content 801 and "view after purchase" content 802 of the movie A 800, as content to be pre-fetched. In this case, the electronic apparatus 100 may obtain a priority of the "preview" content 801 or the "view after purchase" content 802, according to whether the user has purchased the movie A 800.

For example, if the user has not yet purchased the movie A 800, there may be a high probability that the user will select the "preview" content 801 before purchasing the movie A 800. In this case, the electronic apparatus 100 may allocate a higher priority to the "preview" content 801 than to the "view after purchase" content 802.

For example, if resources available in the electronic apparatus 100 are one hardware demultiplexer, one software demultiplexer, two hardware decoders, and one hardware renderer, the electronic apparatus 100 may allocate a hardware demultiplexer 811, a hardware decoder 812, and a hardware renderer 813 to the "preview" content 801 to configure a pipeline 810.

Also, the electronic apparatus 100 may allocate a software demultiplexer 821 and a hardware decoder 822 to the "view after purchase" content 802. In this case, since there is no renderer that can be allocated to the "view after purchase" content 802, the electronic apparatus 100 may allocate a fake renderer 823 to the "view after purchase" content 802 to configure a pipeline 820.

According to another exemplary embodiment, referring to FIG. 8B, if an external input of selecting movie B 830 which is fee content (content for which the user must pay) is received, content with a probability of being selected by the user may be "preview" content 831 or "view after purchase" content 832 of the movie B 830. For example, if the user has already purchased the movie B 830, there may be a high probability that the user will select the "view after purchase" content 832 rather than the "preview" content 831. In this case, the electronic apparatus 100 may allocate a higher priority to the "view after purchase" content 832 than to the "preview" content 831.

Accordingly, the electronic apparatus 100 may allocate a hardware demultiplexer 841, a hardware decoder 842, and a hardware renderer 843 to the "view after purchase" content 832 to configure a pipeline 840, unlike the case shown in FIG. 8A.

Also, the electronic apparatus 100 may allocate a software demultiplexer 851 and a hardware decoder 852 to the "preview" content 831. In this case, since there is no renderer that can be allocated to the "preview" content 831, the electronic apparatus 100 may allocate a fake renderer 853 to the "preview" content 831 to configure a pipeline 850. However, criteria for obtaining priorities of content to be pre-fetched may vary according to exemplary embodiments, and is not limited to the above-described examples.

Figure 9A:
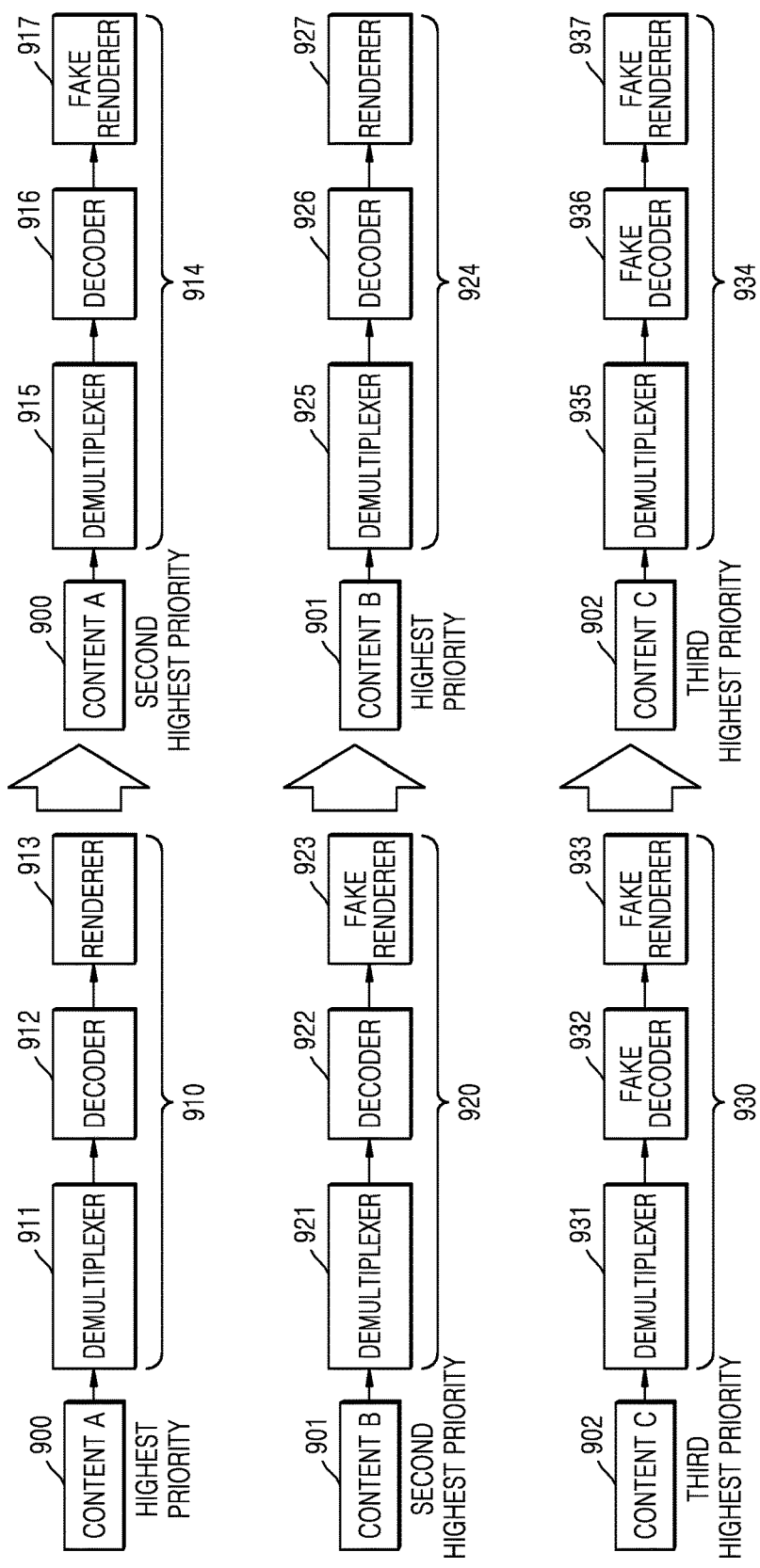
FIGS. 9A and 9B are views illustrating an example in which an electronic apparatus reallocates resources when priorities of content to be pre-fetched change according to an embodiment.
Figure 9B:
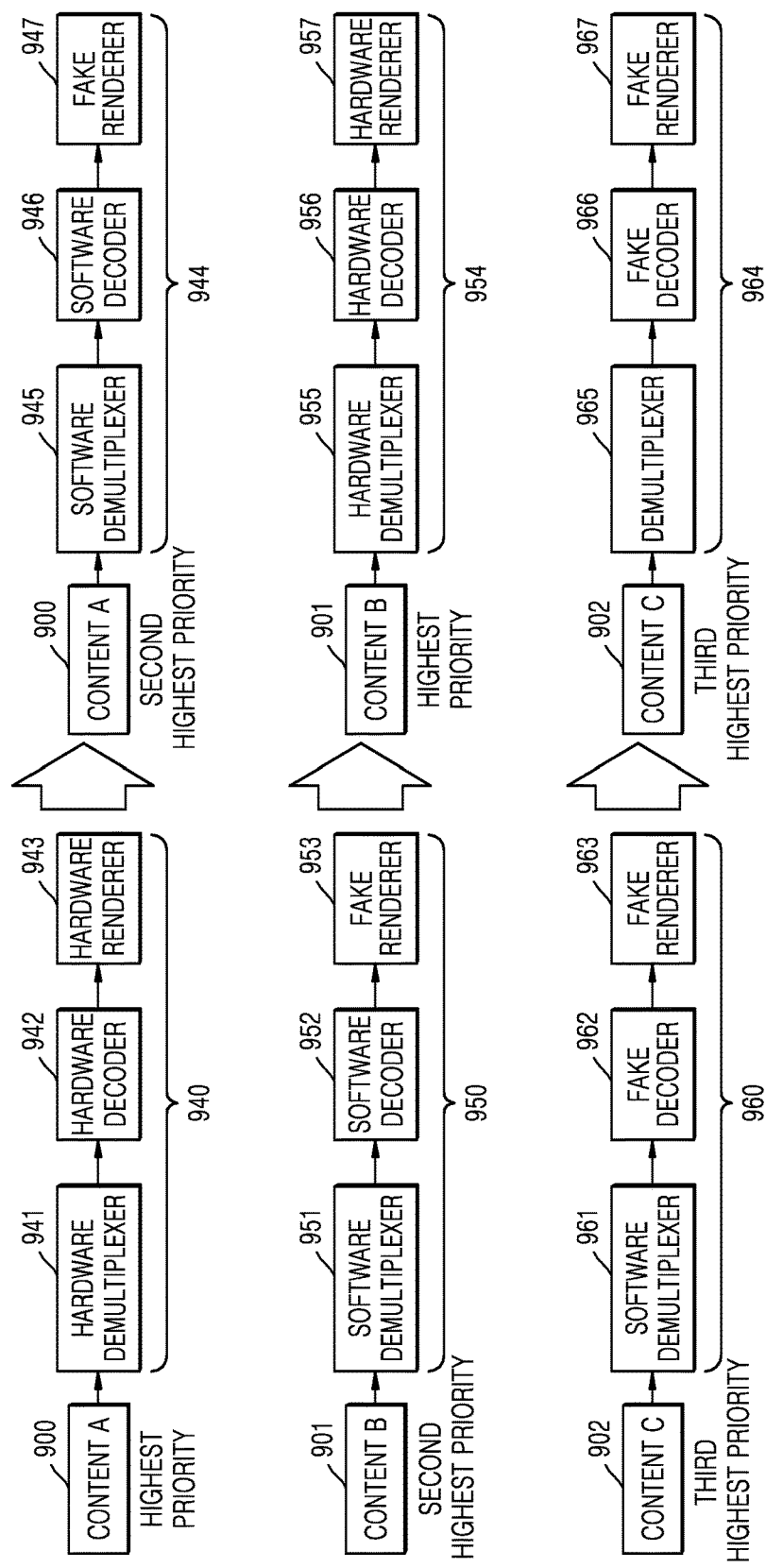

FIGS. 9A and 9B are views illustrating an example in which an electronic apparatus according to an embodiment reallocates resources when priorities of content to be pre-fetched change.

Priorities of one or more items of content that are used to allocate resources when the electronic apparatus 100 performs pre-fetching may change over time. For example, if an external input of moving a focus is received, content on which the focus is currently located may change, and one or more items of content to be pre-fetched may change accordingly. For example, if the electronic apparatus 100 obtains content adjacent to the content on which the focus is currently located, as content to be pre-fetched, one or more items of content to be pre-fetched may change as the content on which the focus is currently located changes. Accordingly, priorities of the one or more items of content to be pre-fetched may also change.

If the priorities of the one or more items of content to be pre-fetched change, the electronic apparatus 100 according to an exemplary embodiment may reallocate resources based on the changed priorities. For example, referring to FIG. 9A, the electronic apparatus 100 may obtain content A 900, content B 901, and content C 902 among a plurality of content, as content to be pre-fetched. In this case, the electronic apparatus 100 may allocate resources to the content A 900, the content B 901, and the content C 902 in the order of the content A 900, the content B 901, and the content C 902, according to a predetermined criteria. For example, if available resources are three demultiplexers, two decoders, and one renderer, the electronic apparatus 100 may allocate a demultiplexer 911, a decoder 912, and a renderer 913 to the content A 900 having a highest priority to configure a pipeline 910.

Also, the electronic apparatus 100 may allocate a demultiplexer 921 and a decoder 922 to the content B 901 having a second highest priority, and allocate a demultiplexer 931 to the content C 902 having a third highest priority. In this case, there may be no renderer that can be allocated to the content B 901, and there may be neither a decoder nor a renderer that can be allocated to the content C 902. Accordingly, the electronic apparatus 100 may allocate a fake renderer 923 to the content B 901, and allocate a fake decoder 932 and a fake renderer 933 to the content C 902 to configure pipelines 920 and 930 for the content B 901 and the content C 902.

However, if the priorities of the content A to C 900 to 902 change, the electronic apparatus 100 according to an exemplary embodiment may reallocate the resources based on the changed priorities. In this case, the priorities of the content A to C 900 to 902 may change when an external input of moving a focus is received, although not limited thereto.

For example, referring to FIG. 9A, the priorities of the content A to C 900 to 902 may change in the order of the content B 901, the content A 900, and the content C 902, in response to an external input of moving a focus. Accordingly, the electronic apparatus 100 may allocate a demultiplexer 925, a decoder 926, and a renderer 927 to the content B 901 having a highest priority to reconfigure a pipeline 924 for the content B 901. Also, the electronic apparatus 100 may allocate a demultiplexer 915 and a decoder 916 to the content A 900 having a second highest priority. Also, the electronic apparatus 100 may allocate a fake renderer 917 to the content A 900 to reconfigure a pipeline 914 for the content A 900.

As described above, the electronic apparatus 100 may reallocate, when the priorities of one or more content to be pre-fetched change, resources based on the changed priorities to thereby dynamically configure a pipeline. Accordingly, the electronic apparatus 100 may allocate resources more preferentially to content having a higher priority so that content selected by a user can be reproduced more quickly.

Also, the electronic apparatus 100 according to an exemplary embodiment may allocate hardware resources more preferentially to content having a higher priority. As described above, the data processing speed of hardware resources may be higher than that of software resources. Accordingly, the electronic apparatus 100 may allocate hardware resources more preferentially to content having a relatively higher priority so that content selected by a user can be reproduced more quickly.

For example, referring to FIG. 9B, if available resources are one hardware demultiplexer, two software demultiplexers, one hardware decoder, one software decoder, and one hardware renderer, the electronic apparatus 100 may allocate a hardware demultiplexer 941, a hardware decoder 942, and a hardware renderer 943 to the content A 900 having a highest priority among the three content to be pre-fetched. Also, the electronic apparatus 100 may allocate a software demultiplexer 951 and a software decoder 952 to the content B 901 having a second highest priority.

However, if the priorities of the content A 900 and the content B 901 change according to a movement of the focus, the electronic apparatus 100 may reallocate the resources according to the changed priorities. For example, the electronic apparatus 100 may allocate a hardware demultiplexer 955, a hardware decoder 956, and a hardware renderer 957 to the content B 901 having a highest priority to configure a pipeline 944. Also, the electronic apparatus 100 may allocate a software demultiplexer 945 and a software decoder 946 to the content A 900 having a second highest priority.

As described above, the electronic apparatus 100 may allocate hardware resources more preferentially to content having a higher priority so as to shorten a time taken for content selected by a user to start being reproduced. Also, the electronic apparatus 100 may reallocate, when the priorities of one or more content to be pre-fetched change, resources based on the changed priorities to thereby efficiently perform pre-fetching.

Figure 10:
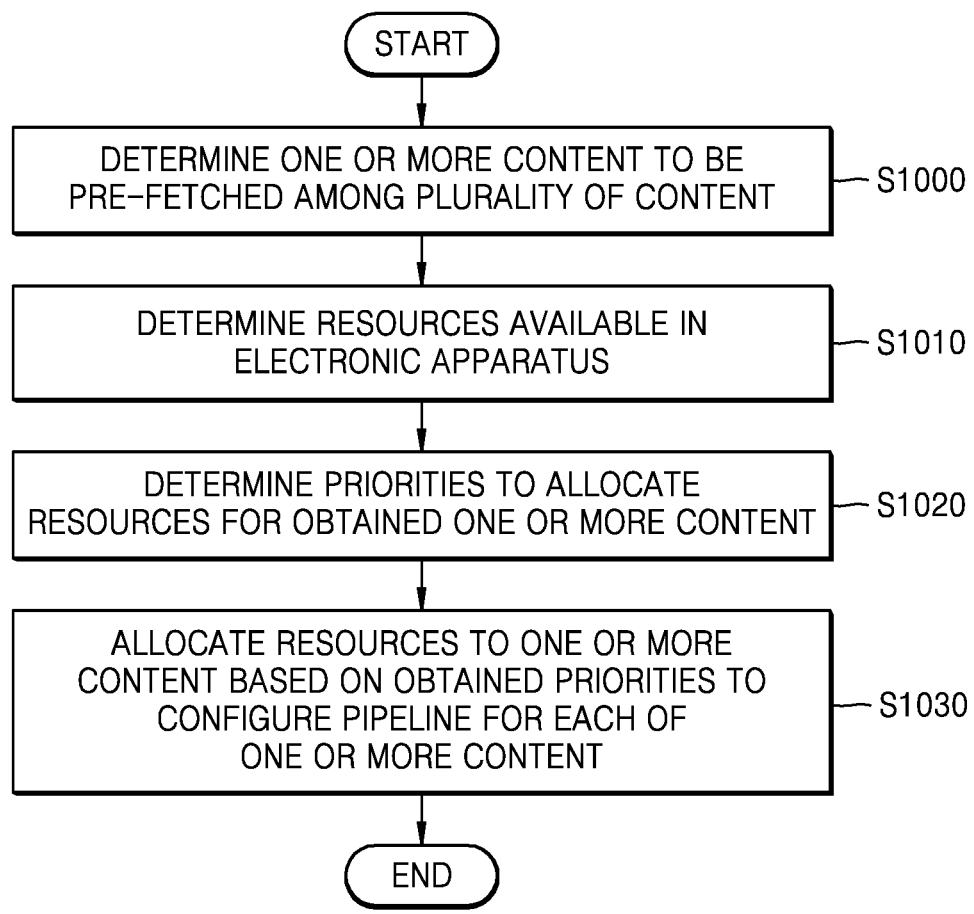
FIG. 10 is a flowchart illustrating a method of operating an electronic apparatus according to an embodiment.

FIG. 10 is a flowchart illustrating a method of operating an electronic apparatus according to an embodiment.

In operation S1000, the electronic apparatus 100 may obtain or determine one or more content to be pre-fetched among a plurality of content. The electronic apparatus 100 may determine or obtain content based on a probability of being selected by a user among a plurality of content, as content to be pre-fetched. For example, the content with the probability of being selected by the user may be obtained based on a current location of a focus (current position or an item that is being emphasized in the menu of contents) and a movement direction of a focus. For example, the electronic apparatus 100 may obtain one or more items of content adjacent to content on which a focus is currently located in a list including a plurality of items of content, as content to be pre-fetched, although not limited thereto.

In operation S1010, the electronic apparatus 100 may determine or obtain resources available in the electronic apparatus 100. The resources may be used to process data that is to be displayed on a screen, and include a demultiplexer, a decoder, a renderer, etc., although not limited thereto. Also, the resources may be implemented as hardware or software according to the various types of resources available.

In operation S1020, the electronic apparatus 100 may obtain or determine priorities to be used to allocate resources, for the one or more items of content to be pre-fetched. The electronic apparatus 100 may allocate a high priority to content located in a direction in which a focus moves, with respect to content on which the focus is currently located. For example, when a focus is moving in a right direction, the electronic apparatus 100 may allocate a high priority to content located to the right of content in which the focus is currently located i.e., to the content on the right, adjacent to the focus position/location.

In operation S1030, the electronic apparatus 100 may allocate resources to the one or more items of content to be pre-fetched, based on the priorities, to configure a pipeline for each content to be pre-fetched. In this case, the electronic apparatus 100 may allocate a hardware resource more preferentially to content having a higher priority. Since data processing speed of hardware resources is higher than that of software resources, the electronic apparatus 100 may allocate a hardware resource more preferentially to content with a higher probability of being selected by a user. Also, when the priorities of the one or more items of content to be pre-fetched change, the electronic apparatus 100 may reallocate the resources to the one or more items of content to be pre-fetched, based on the changed priorities.

Figure 11:
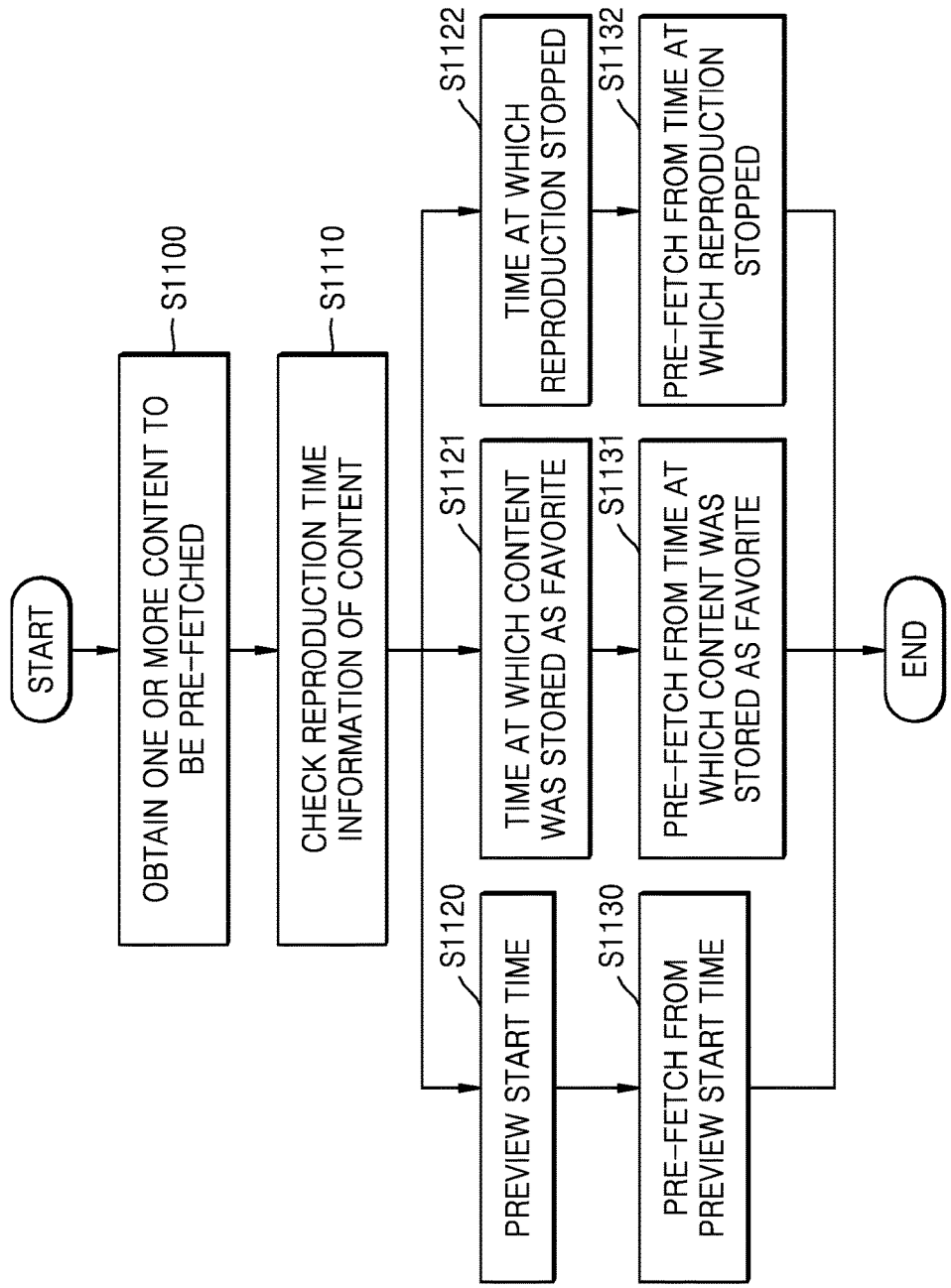
FIG. 11 is a flowchart illustrating an example of obtaining a time at which an electronic apparatus is to perform pre-fetching based on reproduction time information of content according to an embodiment.

FIG. 11 is a view illustrating an example of obtaining a time at which an electronic apparatus is to perform pre-fetching based on reproduction time information of content according to an embodiment.

In operation S1100, the electronic apparatus 100 may obtain or determine one or more items of content to be pre-fetched.

In operation S1110, the electronic apparatus 100 may check reproduction time information for each of the one or more items of content to be pre-fetched. For example, the reproduction time information may include information about a time at which the content was stored as a favorite, information about a time at which the reproduction of the content was stopped, and information about a time at which a preview starts, although not limited thereto. The information about the time at which the preview starts, the information about the time at which the content was stored as the favorite, and the information about the time at which the reproduction of the content stopped, included in the reproduction time information, may be a time with a probability of being selected by a user in the content. For example, a scene preferred by a user in content may be stored as a favorite, and when a user stops reproducing content, a time at which the reproduction of the content stopped may be stored as reproduction time information of the content.

If the reproduction time information of the content includes information about a preview start time, in operation S1120, the electronic apparatus 100 may perform pre-fetching from the preview start time, in operation S1130. Also, if the reproduction time information of the content includes information about a time at which the content was stored as a favorite, in operation S1121, the electronic apparatus 100 may perform pre-fetching from the time at which the content was stored as the favorite, in operation S1131. According to another exemplary embodiment, if the reproduction time information of the content includes information about a time at which the reproduction of the content stopped, in operation S1122, the electronic apparatus 100 may perform pre-fetching from the time at which the reproduction of the content was stopped, in operation S1132.

As described above, the electronic apparatus 100, according to an exemplary embodiment, may obtain a time at which pre-fetching will be performed, based on reproduction time information of content to be pre-fetched. The electronic apparatus 100 may predict a time having a high probability of being selected by a user, when the content is reproduced, and perform pre-fetching from the predicted time. Accordingly, the electronic apparatus 100 can efficiently perform pre-fetching of the content corresponding to the predicted time when there is a high probability of being selected by the user.

The above-described exemplary embodiments may be embodied in the form of program instructions that can be executed through various computing means, and recorded in computer-readable media. The computer-readable media may also include, alone or in combination with the program instructions, data files, data structures, and the like. The program instructions recorded on the media may be those specially designed and constructed for the present disclosure, or they may be of the type well-known and available to those having skill in the computer software arts. Examples of the computer-readable media include magnetic media such as hard disks, floppy disks, and magnetic tape; optical media such as CD-ROM disks and DVDs; magneto-optical media such as floptical disks; and hardware devices that are specially configured to store and perform program instructions, such as ROM, RAM, flash memory, and the like. Examples of the program instructions include both machine code, such as produced by a compiler, and a high-level programming language that may be executed by the computer using an interpreter.

The aforementioned descriptions are only for illustrative purposes, and it will be apparent that those of ordinary skill in the art can make various modifications thereto without changing the technical spirit and essential features of the present disclosure. Thus, it should be understood that exemplary embodiments described above are merely for illustrative purposes and not for limitation purposes in all aspects. For example, each component described as a single type can be implemented in a distributed type, and components described as distributed can be implemented in a combined form.

The scope of the present disclosure would be indicated by the claims, which will be described later, the spirit and scope of the claims and their equivalents, and all such modifications as would be derived from the equivalent concept intended to be included within the scope of the present disclosure.

What is claimed is:

1. An electronic apparatus comprising:
   a processor configured to:
   obtain a content to be pre-fetched among a plurality of contents,
   obtain a resource from among a plurality of resources available in the electronic apparatus, and
   use the obtained resource and a fake resource to form a pipeline in which the obtained content is to be processed,
   wherein the fake resource acts as a placeholder in the pipeline until an appropriate hardware resource or software resource becomes available to replace the fake resource process the obtained content.

2. The electronic apparatus of claim 1, wherein the one content to be pre-fetched has a probability of being selected by a user.

3. The electronic apparatus of claim 2, wherein the content is adjacent to another content from among the plurality of contents, on which a focus is currently located and wherein the plurality of contents are provided in a list for a selection by the user.

4. The electronic apparatus of claim 3, wherein the processor further allocates a high priority to a content item from among the content, which is located in a direction in which the focus moves.

5. The electronic apparatus of claim 1, wherein the processor further reallocates, in response to a change in a priority of the obtained content, the obtained resource to the obtained content, based on the changed priority reconfiguring the pipeline in which the obtained content is processed.

6. The electronic apparatus of claim 1, wherein the processor further allocates the fake resource to the obtained content in response to there being insufficient hardware resources or software resources to form the pipeline which processes the obtained content.

7. The electronic apparatus of claim 1, wherein the pipeline which processes the obtained content comprises a parsing operation, a demuxing operation, a decoding operation, and a rendering operation.

8. The electronic apparatus of claim 1, wherein the pipeline comprises at least one of a hardware demultiplexer, a software demultiplexer, a hardware decoder, a software decoder, and a hardware renderer.

9. The electronic apparatus of claim 1, wherein the processor allocates a hardware resource to an item of the plurality of contents having a higher probability of being selected by a user.

10. A method of operating an electronic apparatus, the method comprising:
    obtaining a content to be pre-fetched from among a plurality of contents,
    obtaining a resource from among a plurality of resources available in the electronic apparatus, and
    using the obtained resource and a fake resource to form a pipeline in which the obtained content is to be processed,
    wherein the fake resource acts as a placeholder in the pipeline until an appropriate hardware resource or software resource becomes available to replace the fake resource to process the obtained content.

11. The method of claim 10, wherein the content to be pre-fetched has a probability of being selected by a user.

12. The method of claim 11, wherein the content is adjacent to another content from among the plurality of contents, on which a focus is currently located and wherein the plurality of contents are provided in a list for a selection by the user.

13. The method of claim 12, further comprising allocating a high priority to a content item from among the plurality of contents, which is located in a direction in which the focus moves.

14. The method of claim 10, further comprising in response to a change in a priority of the obtained content, reallocating the obtained resource to the obtained content, based on the change in the priority, and reconfiguring the pipeline in which the obtained content is processed.

15. A computer-readable recording medium having recorded thereon a program for implementing the method of operating the electronic apparatus of claim 10.

\* \* \* \* \*